(12) United States Patent
Liu

(10) Patent No.: US 6,687,854 B1
(45) Date of Patent: Feb. 3, 2004

(54) METHOD OF VISUALLY SIGNALING COMPUTER HARDWARE FAULTS ON KEYBOARD

(75) Inventor: Chuan Fang Liu, No. 10-40, Chang Ping N. Rd., Tou Liu City, Yunlin Hsiang (TW)

(73) Assignees: Chuan Fang Liu, Yunlin Hsiang (TW); Gilan Wu, Yunlin Hsiang (TW); Meichuan Wang, Yunlin Hsiang (TW); Xiujun Liu, Yunlin Hsiang (TW)

( * ) Notice: Subject to any disclaimer, the term of this patent is extended or adjusted under 35 U.S.C. 154(b) by 524 days.

(21) Appl. No.: 09/697,116

(22) Filed: Oct. 27, 2000

(51) Int. Cl.[7] ................................................. H02H 3/05
(52) U.S. Cl. ............................................. 714/25; 713/2
(58) Field of Search .............................. 714/25, 42, 43, 714/44, 36; 713/1, 2, 100

(56) References Cited

U.S. PATENT DOCUMENTS

| | | | | |
|---|---|---|---|---|
| 4,992,928 A | * | 2/1991 | Ishihara et al. | ................ 700/78 |
| 6,240,519 B1 | * | 5/2001 | James et al. | ................ 713/202 |
| 6,330,514 B1 | * | 12/2001 | Kuo | .............................. 702/35 |
| 6,363,492 B1 | * | 3/2002 | James et al. | .................... 714/1 |
| 6,405,311 B1 | * | 6/2002 | Broyles et al. | ................ 713/2 |

* cited by examiner

Primary Examiner—Dieu-Minh Le
(74) Attorney, Agent, or Firm—Rosenberg, Klein & Lee

(57) ABSTRACT

A method for displaying reasons of computer hardware faults by light emitting diodes on a keyboard is disclosed. Some parts of the program of the basic input/output system (BIOS) are addressed to the light emitting diodes on a keyboard. Then the programmed numerical codes are outputted so that the basic input/output system performs a power on self-test (POST). By the illumination of the light emitting diodes and checking up a table, the fault condition can be known.

3 Claims, 3 Drawing Sheets

| NUM LOCK LCD | CAPS LOCK LCD | SCROLL LOCK LCD | TEST PROCESS |
|---|---|---|---|
| 0 | 0 | 0 | MEMORY TEST |
| 0 | 0 | 1 | BUS TEST |
| 0 | 1 | 0 | CPU TEST |
| 0 | 1 | 1 | CACHE TEST |
| 1 | 0 | 0 | CHIPSET TEST |
| 1 | 0 | 1 | RTC TEST |
| 1 | 1 | 0 | VGA TEST |
| 1 | 1 | 1 | LIGHT UP SCREEN |

FIG. 3

METHOD OF VISUALLY SIGNALING COMPUTER HARDWARE FAULTS ON KEYBOARD

FIELD OF THE INVENTION

The present invention relates to a method for displaying reasons of computer hardware faults by light emitting diodes on a keyboard, and especially to a method for acquiring the fault information about the hardware or components of a computer by the illumination of the light emitting diodes on the keyboard without needing 80H port fault removing card.

BACKGROUND OF THE INVENTION

In the prior art of displaying the fault of computer hardware, the basic input/output system (BIOS) will test the hardware and components of a computer by a power on self test (POST), then the basic input/output system make an initial test to and initializes the memories, caches, chipsets, clock chip (RTC) and graphic chip (VGA). After the hardware for lighting up a screen has no fault, the screen lights up. Then, basic input/output system tests and initializes other devices not tested, for example, extension memories, disk drives, plug-in cards, etc. If all are right, then the operation system is loaded. When the screen light up, the user may know the faults from the display of the screen for removing the faults.

If the faults occur before the screen lights up, then the computer casing must be opened, and then an 80H. port fault removing card is plug-in the extension slot. Then the basic input/output system tests the hardware and components of the computer. Referring to FIG. 1, at first, the basic input/output system addresses to the 80H port fault removing card (step 10), and outputs the programmed numerical codes (step 11) (in the basic input/output system, each test stage has its own numerical code which is programmed in advance). Then, the 80H port fault removing card performs an unlock action and displays the relative numerical code (step 12). Then, it tests whether the computer hardware or components has faults (step 13)?

If yes, the basic input/output system stops the test in the following stage. The 80H port fault removing card remains to display the numerical code (step 14). The user checks the fault condition from a table and then repairs it further (step 15).

If no, the basic input/output system outputs the numerical code in the succeeding stage (step 16). Then, the test of the following stage is performed (step 17). If all tests are correct, then the operation system is loaded (step 18). However, displaying fault reason through an 80H port fault removing card has the following defects:

(1) The cost of 80H port fault removing card has a high cost, and thus it is formed as a plug-in card. Therefore, it is not popular.

(2) The computer casing must be opened for installing the 80H port fault removing card. Therefore, the operation is difficult.

Therefore, the prior art method for displaying reasons of computer hardware faults through an 80H port fault removing card is not preferred. In practical application, it is inconvenient and has many defects which are necessary to be improved.

SUMMARY OF THE INVENTION

Accordingly, the primary object of the present invention is to provide a method for displaying reasons of computer hardware faults by light emitting diodes on a keyboard, in which the display conditions of light emitting diode are encoded. When the program code in the basic input/output system tests the hardware or components are tested, the numerical codes programmed in advance are outputted to the three light emitting diodes. If faults occur, the numerical code displayed through the three light emitting diodes are read for checking on a table. Therefore, the faults reasons of the computer hardware can be acquired without needing to increase the cost of hardware. The fault analysis before lighting up a screen can be performed through the light emitting diodes on the screen. The cost of hardware is reduced greatly and the popularity is increased greatly. Furthermore, the computer casing is unnecessary to be opened for installing other device. Thus, the operation is easily. From the condition of the light emitting diodes on the light emitter, the user may know the condition of the computer. The old system is unnecessary to update circuit for being arranged with the present invention. It is only needed to burn the program code of the basic input/output system. Therefore, the condition of the computer system can be acquired from the keyboard.

To achieve the aforesaid object, the present invention provides a method for displaying reasons of computer hardware faults by light emitting diodes on a keyboard. Since the personal computer is equipped with a keyboard and there are three light emitting diodes on the keyboard, which are a Num Lock LED, a Caps Lock LED and a Scroll Lock LED. These three light emitting diodes have no function in the starting up test before the screen lights up. Thus, the display condition of the three light emitting diodes can be encoded. When the program code of the basic input output system tests the hardware of components of a computer, the set numerical code is outputted to the light emitting diodes on the keyboard so that as the hardware or components have faults, then the fault condition can be displayed on the light emitting diodes on the keyboard so that the fault reason on the computer hardware or components can be acquired.

The various objects and advantages of the present invention will be more readily understood from the following detailed description when reading in conjunction with the appended drawing.

BRIEF DESCRIPTION OF THE DRAWINGS

FIG. 3 is a chart showing an embodiment of the present invention.

DETAILED DESCRIPTION OF THE PREFERRED EMBODIMENTS

Figure 1:
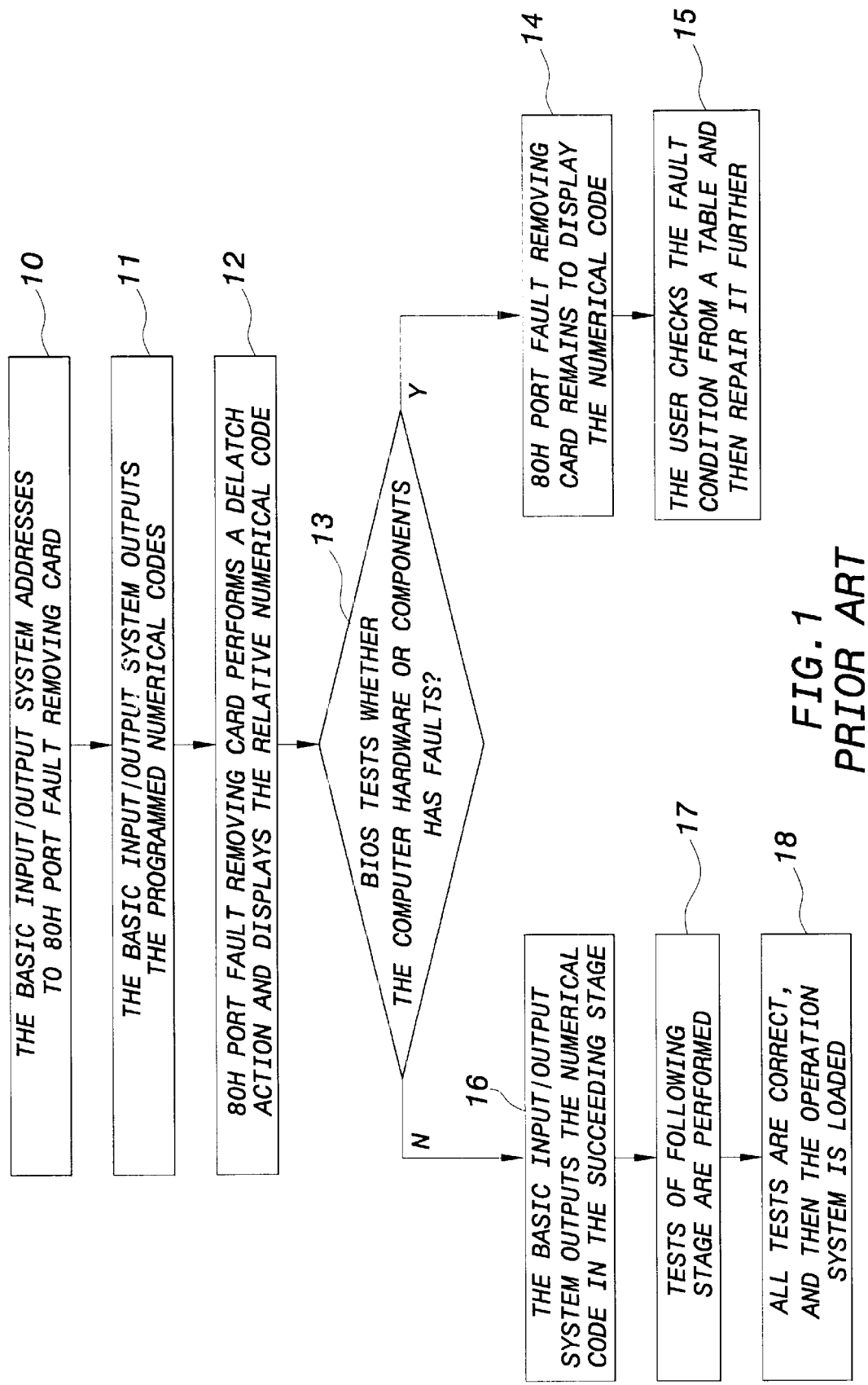
FIG. 1 is a flow diagram of a prior art.
Figure 2:
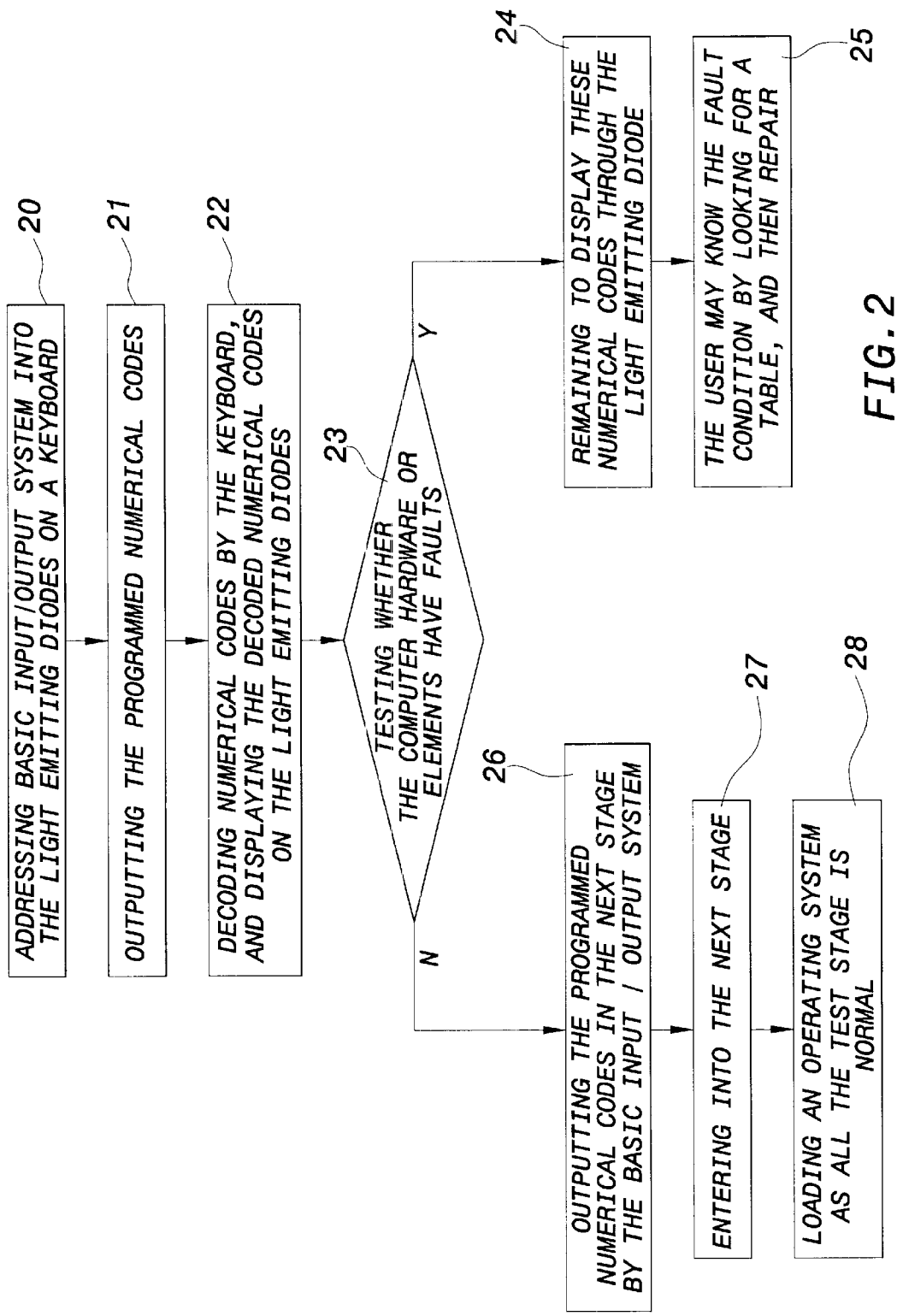
FIG. 2 is a flow diagram of the present invention.

With reference to FIG. 2, the method for displaying reasons of computer hardware faults by light emitting diodes on a keyboard according to the present invention is illustrated. The method comprises the steps of addressing basic input/output system the light emitting diodes on a keyboard (step 20), and outputting the programmed numerical codes (which is set in the program by the user, so that each test stage has its own programmed numerical code) in advance (step 21); decoding numerical codes by the keyboard, and displaying the decoded numerical codes on the light emitting diodes (step 22); then, testing whether the computer hardware or elements have faults (step 23);

If yes, remaining to display these numerical codes through the light emitting diode (step 24). The user may know the fault condition by looking for a table, and then repair it;

If no, outputting the programmed numerical codes in the next stage by the basic input/output system (step 26); then entering into the next stage (step 27); loading an operating system as all the test stage is normal (step 28).

Referring to FIG. 3, an application of the present invention is illustrated herein. This application comprises the following steps. At first, the basic input/output system is addressed to the light emitting diodes on the keyboard and then the numerical codes "000" for the memory test stage is outputted. After decoding, all the three light emitting diodes do not light up. It represents that the memory test is performed. Then, the memory is tested to determine whether faults occur?

If yes, the three light emitting diodes remains to be extinguished. The user may know the fault in the circuit of the memory and then repairs it.

If no, the basic output/input system outputs the numerical code "001" about the bus test stage. After decoding, only the scroll lock light emitting diode is .conductive, it represents that the bus test stage is performed.

If yes, only the scroll lock light emitting diode is conductive, the user may know whether the related circuits of the bus h:as faults and then repairs it.

If no, the basic output/input system outputs the numerical code "010" of the central processing unit test stage. After decoding, only the Caps lock light emitting diode is conductive. It represents the central processing unit is now tested. Then, the central processing unit is test.

If yes, only the Caps lock light emitting diode is conductive, the user may know that the central processing unit has faults by looking up a table and then repairs it.

If no, the basic input/output system sequentially outputs the codes of the cache, the chipset, the clock chip, the displaying chip and then testing. From the conduction of three light emitting diodes, the fault condition can be acquired. Only it is assured that the hardware and elements for lighting up the screen have no fault, then the screen is light up. Then, the computer hardware and elements without being tested is test until all the test stages are normal, then the operation system is loaded.

Therefore, the method for displaying reasons of computer hardware faults by light emitting diodes on a keyboard of the present invention has the following advantages:

1. The fault analysis before lighting up a screen can be performed without needing increasing any hardware cost, and therefore, the cost of hardware is saved greatly and the popularity is improved.

2. The installation of the device can be performed without opening the computer casing.

3. It can be operated easily, the user may know the conditions of the central processing unit by only viewing the light emitting diodes.

4. The wiring in an old system is unnecessary to be improved. It is only needed to burn the numerical code into the programming code of a basic input/output system, then the condition can be known from the light emitting diode on a keyboard.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method of visually signaling hardware faults of a computer on a keyboard coupled thereto, comprising the steps of:

a. addressing at least a portion of a basic input/output system to a plurality of light emitting diodes disposed on the keyboard;

b. fault testing a plurality of hardware components of the computer; and, c. dynamically actuating said light emitting diodes in a manner responsive to said fault testing of hardware components for visually indicating on the keyboard a unique numerically coded identity for a corresponding one of said hardware components when a hardware component fault is detected.

2. The method as recited in claim 1, wherein said hardware components of the computer include memories, buses, central processing units, caches, chipsets, clock chips, and graphic chips.

3. The method as recited in claim 1 wherein step c includes the steps of: actuating said light emitting diodes to sequentially identify each of said hardware components during said testing thereof; and, interrupting said sequential identification said hardware component fault detection to maintain said visual indication of said unique numerically coded identity corresponding thereto on the keyboard.

* * * * *